US012803107B2

(12) United States Patent
Sodeyama

(10) Patent No.: US 12,803,107 B2
(45) Date of Patent: Nov. 17, 2026

(54) SECONDARY BATTERY

(71) Applicant: MURATA MANUFACTURING CO., LTD., Kyoto (JP)

(72) Inventor: Kunio Sodeyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 499 days.

(21) Appl. No.: 18/591,391

(22) Filed: Feb. 29, 2024

(65) Prior Publication Data

US 2024/0204340 A1 Jun. 20, 2024

Related U.S. Application Data

(63) Continuation of application No. PCT/JP2022/034382, filed on Sep. 14, 2022.

(30) Foreign Application Priority Data

Oct. 11, 2021 (JP) ................................ 2021-167068

(51) Int. Cl.
*H01M 50/342* (2021.01)
*H01M 10/0525* (2010.01)
(Continued)

(52) U.S. Cl.
CPC ... *H01M 50/3425* (2021.01); *H01M 10/0525* (2013.01); *H01M 50/107* (2021.01); *H01M 50/152* (2021.01); *H01M 50/578* (2021.01)

(58) Field of Classification Search
None
See application file for complete search history.

(56) References Cited

U.S. PATENT DOCUMENTS

2008/0206633 A1 8/2008 Matsuoka
2018/0047949 A1 2/2018 Sugimoto et al.
(Continued)

FOREIGN PATENT DOCUMENTS

JP 2008210620 A 9/2008
WO 2016/157748 10/2016
(Continued)

OTHER PUBLICATIONS

International Search Report of corresponding PCT application PCT/JP2022/034382, dated Nov. 22, 2022.

*Primary Examiner* — Jonathan Crepeau
(74) *Attorney, Agent, or Firm* — K&L Gates LLP

(57) ABSTRACT

The secondary battery includes a battery device, a container member, and a safety valve mechanism. The safety valve mechanism is attached to an end part, of the container member, in a height direction. The safety valve mechanism includes a valve member having an electrically conductive property, an insulating holder member, and an electrically conductive member. The valve member includes a valve part and an annular protruding part. The valve part is cleavable. The annular protruding part extends along a horizontal plane and surrounds the valve part. The horizontal plane is orthogonal to the height direction. The insulating holder member includes insulating pieces into which the insulating holder member is divided in a circling direction in which the annular protruding part extends. The insulating pieces each include an abutting part positioned on an inner side of the annular protruding part in a radial direction of the container member and abutting against the annular protruding part. The electrically conductive member includes a projecting part electrically coupled to the valve part. The electrically conductive member overlaps with the valve member in the height direction and is held by the insulating holder member.

11 Claims, 9 Drawing Sheets

(51) Int. Cl.
*H01M 50/107* (2021.01)
*H01M 50/152* (2021.01)
*H01M 50/578* (2021.01)

(56) References Cited

U.S. PATENT DOCUMENTS

| | | | | |
|---|---|---|---|---|
| 2019/0103625 | A1 | 4/2019 | Haraguchi et al. | |
| 2019/0109303 | A1* | 4/2019 | Suzuki ................ | H01M 50/342 |
| 2020/0259202 | A1 | 8/2020 | Haraguchi et al. | |
| 2022/0069408 | A1 | 3/2022 | Yoshida et al. | |

FOREIGN PATENT DOCUMENTS

| | | | |
|---|---|---|---|
| WO | 2017/164000 | A1 | 9/2017 |
| WO | 2019/082712 | A1 | 5/2019 |
| WO | 2020/137372 | A1 | 7/2020 |

* cited by examiner

SECONDARY BATTERY

CROSS REFERENCE TO RELATED APPLICATIONS

The present application is a continuation of PCT patent application no. PCT/JP2022/034382, filed on Sep. 14, 2022, which claims priority to Japanese patent application no. 2021-167068, filed on Oct. 11, 2021, the entire contents of which are incorporated herein by reference.

BACKGROUND

The present technology relates to a secondary battery including a safety valve mechanism.

Various kinds of electronic equipment, including mobile phones, have been widely used. Such widespread use has invoked a need for a smaller size, a lighter weight, and a longer life of the electronic equipment. To address the need, it is smaller in size and lighter in weight as a power source.

A secondary battery includes a positive electrode, a negative electrode, and an electrolytic solution. In order to suppress occurrence of malfunction due to a gas when the gas is generated due to, for example, a decomposition reaction of the electrolytic solution, the secondary battery includes a safety valve mechanism configured to release the gas to an outside on an as-needed basis.

SUMMARY

The present technology relates to a secondary battery including a safety valve mechanism.

Consideration has been given in various ways to improve performance of a secondary battery. There is, however, still room for improvement in terms of the performance of the secondary battery.

It is therefore desirable to provide a secondary battery having superior performance.

A secondary battery according to an embodiment of the present technology includes a battery device, a container member, and a safety valve mechanism. The battery device includes a positive electrode, a negative electrode, and an electrolytic solution. The container member contains the battery device. The safety valve mechanism is attached to an end part, of the container member, in a height direction. The safety valve mechanism includes a valve member, an insulating holder member, and an electrically conductive member. The valve member has an electrically conductive property. The valve member includes a valve part and an annular protruding part. The valve part is cleavable. The annular protruding part extends along a horizontal plane and surrounds the valve part. The horizontal plane is orthogonal to the height direction. The insulating holder member includes insulating pieces into which the insulating holder member is divided in a circling direction in which the annular protruding part extends. The insulating pieces each include an abutting part positioned on an inner side of the annular protruding part in a radial direction of the container member and abutting against the annular protruding part. The electrically conductive member includes a projecting part electrically coupled to the valve part. The electrically conductive member overlaps with the valve member in the height direction and is held by the insulating holder member.

With a simple configuration, the secondary battery of an embodiment allows an internally generated gas to be discharged and allows the valve member and the electrically conductive member to be firmly held by the insulating holder member. Accordingly, it is possible to improve vibration resistance performance of the secondary battery while securing safety performance.

Note that effects of the present technology are not necessarily limited to those described herein and may include any of a series of effects in relation to the present technology.

DETAILED DESCRIPTION

The present technology will be described below in further detail including with reference to the drawings according to an embodiment.

A description is given first of a secondary battery according to an embodiment of the present technology.

Although a charge and discharge principle of the secondary battery to be described below is not particularly limited, the following description deals with a case where a battery capacity is obtained using insertion and extraction of an electrode reactant.

The secondary battery includes a positive electrode, a negative electrode, and an electrolyte. In the secondary battery, a charge capacity of the negative electrode is greater than a discharge capacity of the positive electrode. In other words, an electrochemical capacity per unit area of the negative electrode is greater than an electrochemical capacity per unit area of the positive electrode. This is to prevent precipitation of the electrode reactant on a surface of the negative electrode during charging.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery in which the battery capacity is obtained through insertion and extraction of lithium is what is called a lithium-ion secondary battery. In the lithium-ion secondary battery, lithium is inserted and extracted in an ionic state.

Figure 1:
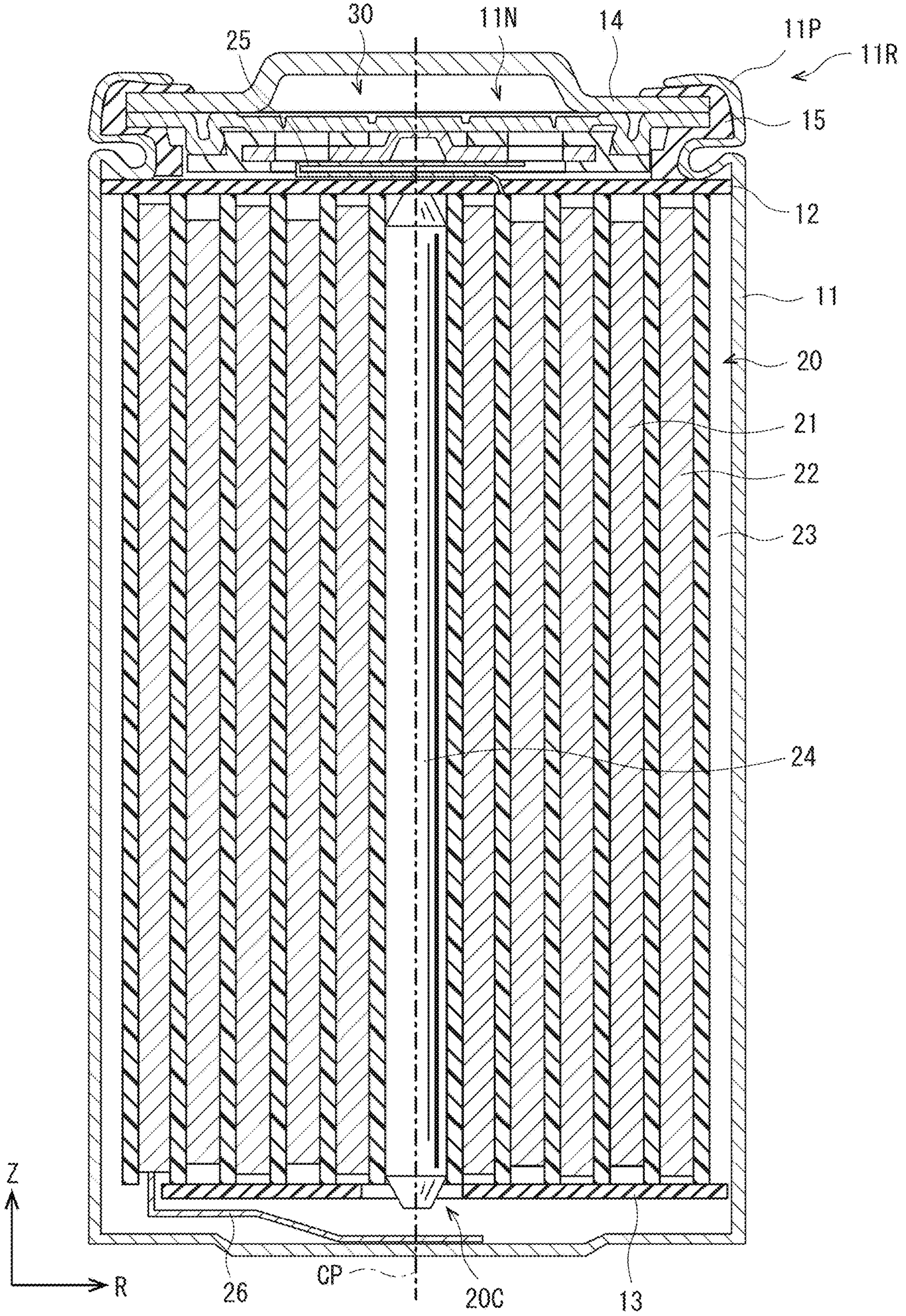
FIG. 1 is a sectional diagram illustrating an overall configuration example of a secondary battery according to an embodiment of the present technology.

FIG. 1 illustrates a sectional configuration of the secondary battery. The secondary battery is a secondary battery in which a battery device 20 is contained inside a battery can 11 having a cylindrical shape as illustrated in FIG. 1, that is, what is called a secondary battery of a cylindrical type. A reference sign CP denotes a central axis of the secondary battery.

Hereinafter, a direction in which the battery device 20 is placed into the battery can 11, that is, a height direction of the battery can 11 having the cylindrical shape, is referred to as a Z direction; and a radial direction of the battery can 11 having the cylindrical shape is referred to as an R direction.

More specifically, in the secondary battery illustrated in FIG. 1, for example, a pair of insulating plates 12 and 13 and the battery device 20 are contained inside the battery can 11 having the cylindrical shape. A safety valve mechanism 30 is attached to the battery can 11. The battery can 11 is, for example, sealed by a battery cover 14. Note that the secondary battery may further include components including, without limitation, a thermosensitive resistive (PTC) device and a reinforcing member inside the battery can 11.

The battery can 11 and the battery cover 14 are specific examples of a "container member" of the disclosure.

The battery can 11 is a container having a hollow structure that extends in the Z direction, with one end part in the Z direction closed and another end part in the Z direction open. The one end part of the battery can 11 in the Z direction is an open end part 11N. The battery can 11 includes, for example, any one or more of metal materials including, without limitation, iron, aluminum, and alloys thereof. The battery can 11 may have a surface plated with, for example, any one or more of metal materials including, without limitation, nickel.

The pair of insulating plates 12 and 13 is disposed with the battery device 20 interposed therebetween in the Z direction and extends along a plane orthogonal to the Z direction.

The battery cover 14 and the safety valve mechanism 30 are crimped at the open end part 11N of the battery can 11 with the gasket 15 interposed between the open end part 11N and both the battery cover 14 and the safety valve mechanism 30. The battery can 11 is thus provided with a bent part 11P defining the open end part 11N.

The open end part 11N of the battery can 11 is sealed by the battery cover 14 in a state where the battery device 20 and other components are contained inside the battery can 11. The battery can 11 has a crimped structure 11R provided in the vicinity of the open end part 11N. The crimped structure 11R is a structure in which the bent part 11P defining the open end part 11N and both the battery cover 14 and the safety valve mechanism 30 are crimped to each other with the gasket 15 interposed therebetween. The bent part 11P is what is called a crimp part, and the crimped structure 11R is also called a crimp structure.

The battery cover 14 is a cover member that closes the open end part 11N of the battery can 11. The battery cover 14 may include a material similar to the material included in the battery can 11. However, the battery cover 14 may include a material different from the material included in the battery can 11.

In particular, the battery cover 14 preferably includes stainless steel. A reason for this is that this secures physical strength of the battery cover 14 and accordingly secures physical strength of the crimped structure 11R, suppressing detachment of the battery cover 14 and leakage of an electrolytic solution even if an internal pressure of the battery can 11 increases. Specific examples of the stainless steel include SUS304 and SUS430.

A middle part of the battery cover 14 is bent to protrude in a direction away from the battery device 20, i.e., in a +Z direction. A portion other than the middle part, that is, a peripheral part, of the battery cover 14 is thus adjacent to a safety cover 31 of the safety valve mechanism 30. The safety cover 31 will be described later.

The gasket 15 is a sealing member that seals a gap between the bent part 11P and the battery cover 14. The gasket 15 is interposed between the bent part 11P of the battery can 11 and the battery cover 14.

The gasket 15 includes any one or more of insulating materials. Specific examples of the insulating materials include a polymer material such as polybutylene terephthalate (PBT) or polypropylene (PP). In particular, the gasket 15 preferably includes polypropylene. A reason for this is that the gap between the bent part 11P and the battery cover 14 is sufficiently sealed while the battery can 11 and the battery cover 14 are electrically separated from each other.

The safety valve mechanism 30 is provided on an inner side of the battery cover 14 in the Z direction. The safety valve mechanism 30 is a mechanism that, when the internal pressure of the battery can 11 increases, releases the internal pressure by unsealing the battery can 11 on an as-needed basis. A cause of the increase in the internal pressure of the battery can 11 is, for example, a gas generated due to a decomposition reaction of the electrolytic solution during charging and discharging. A detailed configuration of the safety valve mechanism 30 will be described later with reference to FIGS. 2 to 7C to be described later. The safety valve mechanism 30 is a specific example corresponding to a "safety valve mechanism" of the disclosure.

The battery device 20 is contained inside the battery can 11, and includes a positive electrode 21, a negative electrode 22, and an electrolytic solution. The electrolytic solution is a liquid electrolyte.

Here, the battery device 20 is what is called a wound electrode body. That is, in the battery device 20, the positive electrode 21 and the negative electrode 22 are stacked on each other with a separator 23 interposed therebetween, and the stack of the positive electrode 21, the negative electrode 22, and the separator 23 is wound. The positive electrode 21, the negative electrode 22, and the separator 23 are each impregnated with the electrolytic solution.

The battery device 20 has, at the center thereof, a space resulting from winding the positive electrode 21, the negative electrode 22, and the separator 23, i.e, a center space 20C. A center pin 24 is disposed in the center space 20C. However, the center pin 24 may be omitted.

A positive electrode lead 25 is coupled to the positive electrode 21. A negative electrode lead 26 is coupled to the negative electrode 22. The positive electrode lead 25 includes any one or more of electrically conductive materials including, without limitation, a metal material. Specific examples of the metal material included in the positive electrode lead 25 include aluminum. The positive electrode lead 25 is electrically coupled to the battery cover 14 via the safety valve mechanism 30. The negative electrode lead 26 includes any one or more of electrically conductive materials including, without limitation, a metal material. Specific examples of the metal material included in the negative electrode lead 26 include nickel. The negative electrode lead 26 is electrically coupled to the battery can 11.

A detailed configuration of the battery device 20, i.e., a detailed configuration of each of the positive electrode 21, the negative electrode 22, the separator 23, and the electrolytic solution will be described later with reference to FIG. 8.

Figure 2:
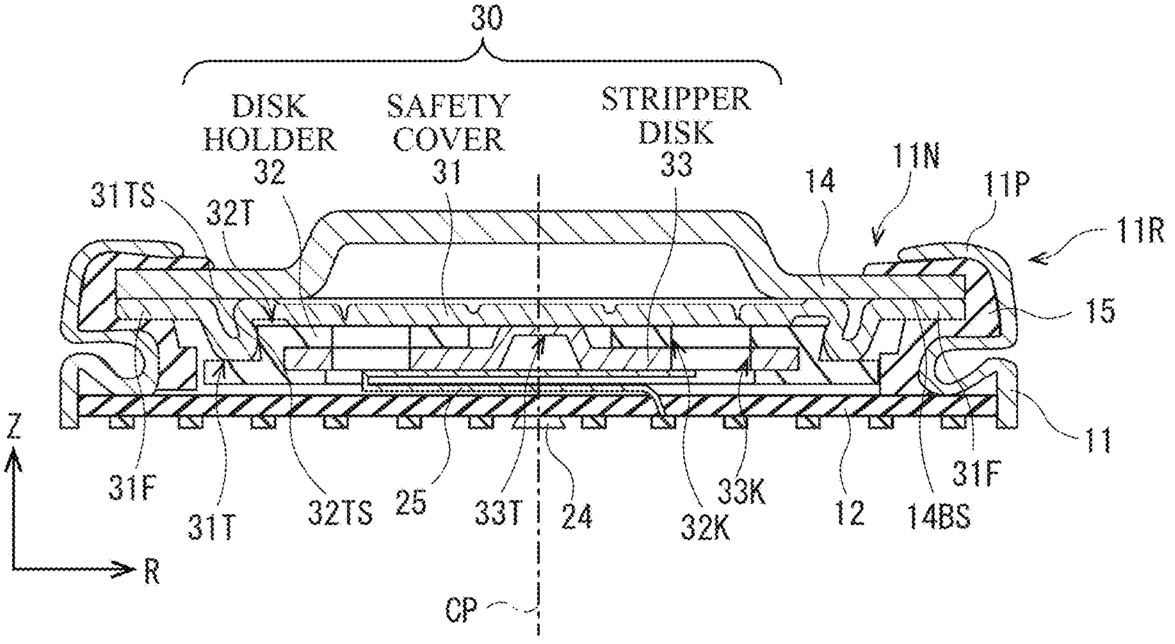
FIG. 2 is an enlarged sectional diagram illustrating, in an enlarged manner, a configuration example of an upper part of the secondary battery illustrated in FIG. 1.
Figure 3:
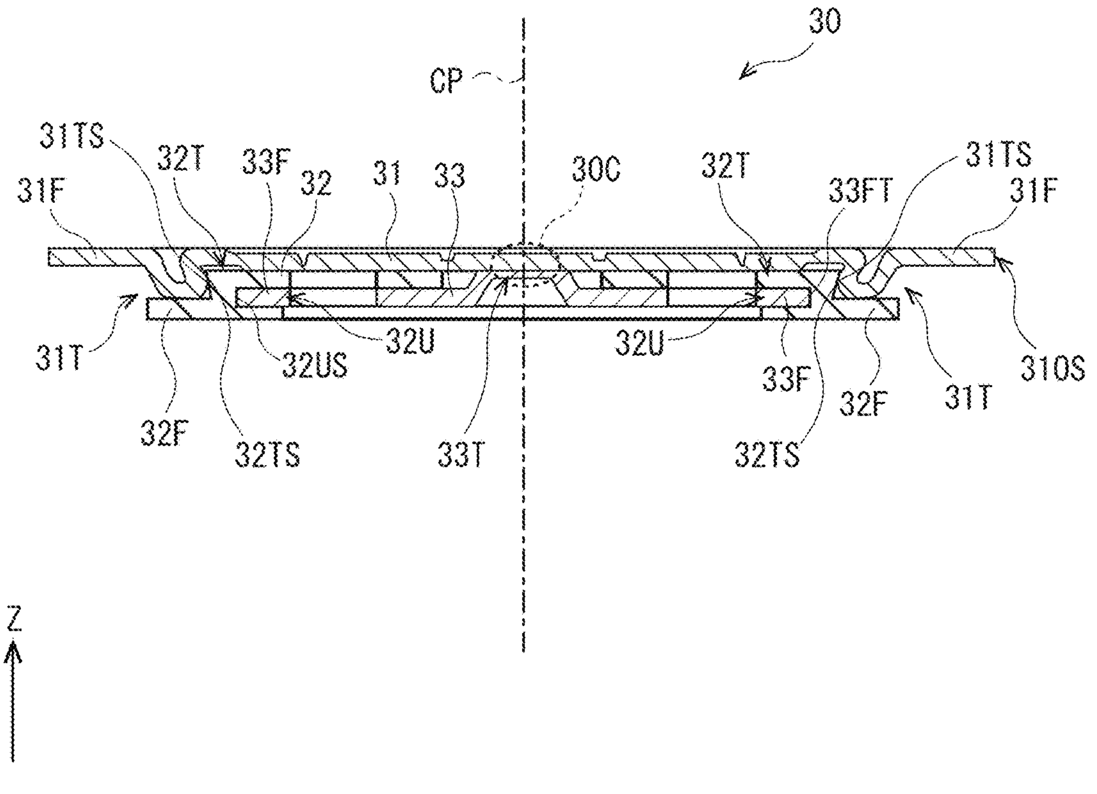
FIG. 3 is an enlarged sectional diagram illustrating, in an enlarged manner, a configuration example of a safety valve mechanism of the secondary battery illustrated in FIG. 1.

FIG. 2 illustrates a portion of a sectional configuration of the secondary battery illustrated in FIG. 1, and more specifically, illustrates the safety valve mechanism 30 and the vicinity thereof. FIG. 3 is an enlarged sectional diagram illustrating, in an enlarged manner, a configuration example of the safety valve mechanism 30.

The safety valve mechanism 30 includes a safety cover 31, a disk holder 32, and a stripper disk 33, as illustrated in FIG. 2. The safety cover 31 and the stripper disk 33 are fixed to each other with the disk holder 32 interposed therebetween. In addition, the safety cover 31 and the stripper disk 33 are electrically insulated from each other by the disk holder 32, in a portion other than a coupling portion. The coupling portion is provided in a middle region of each of the safety cover 31 and the stripper disk 33. The stripper disk 33 is positioned on a battery device 20 side, when viewed from the safety cover 31. That is, the safety cover 31 is provided between the stripper disk 33 and the battery cover 14.

Figure 4:
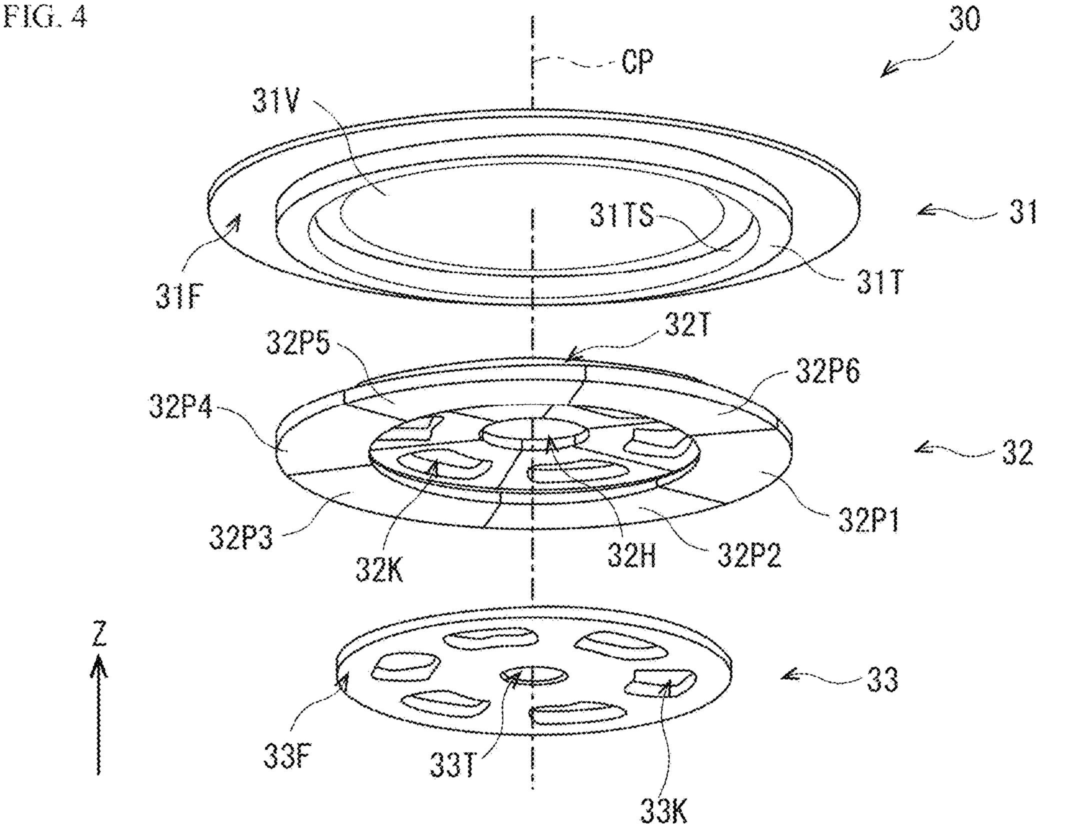
FIG. 4 is an exploded perspective diagram of the safety valve mechanism illustrated in FIG. 3.
Figure 5:
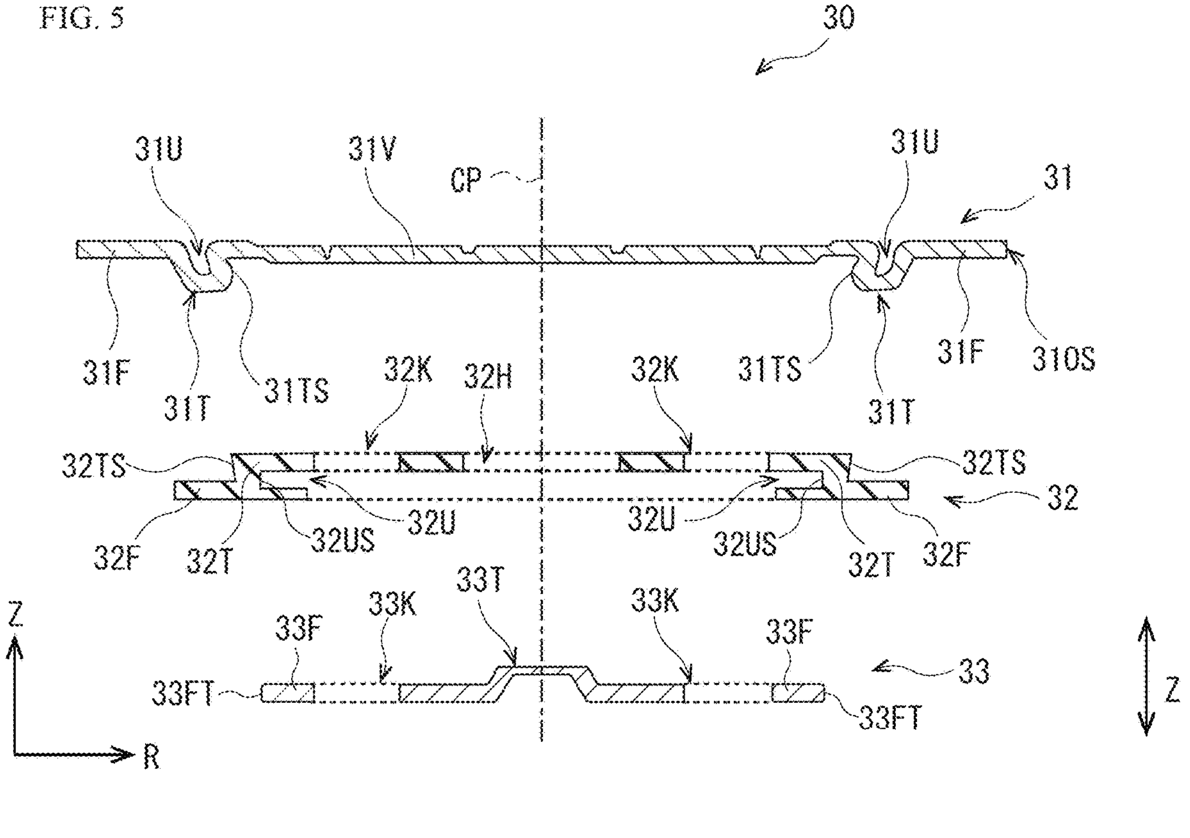
FIG. 5 is an exploded sectional diagram of the safety valve mechanism illustrated in FIG. 3.
Figure 6:
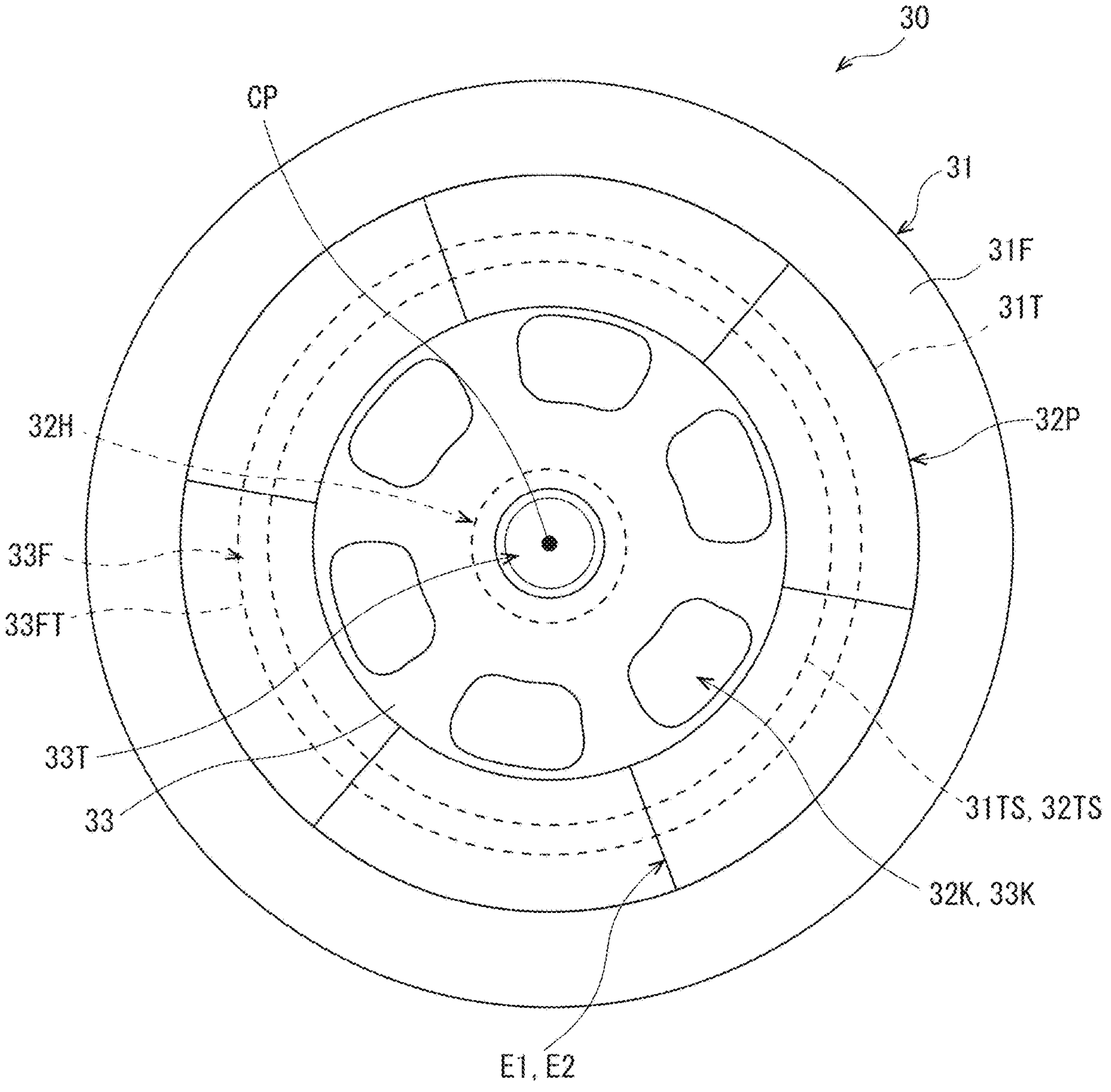
FIG. 6 is a schematic plan diagram of the safety valve mechanism illustrated in FIG. 3.
Figure 7A:
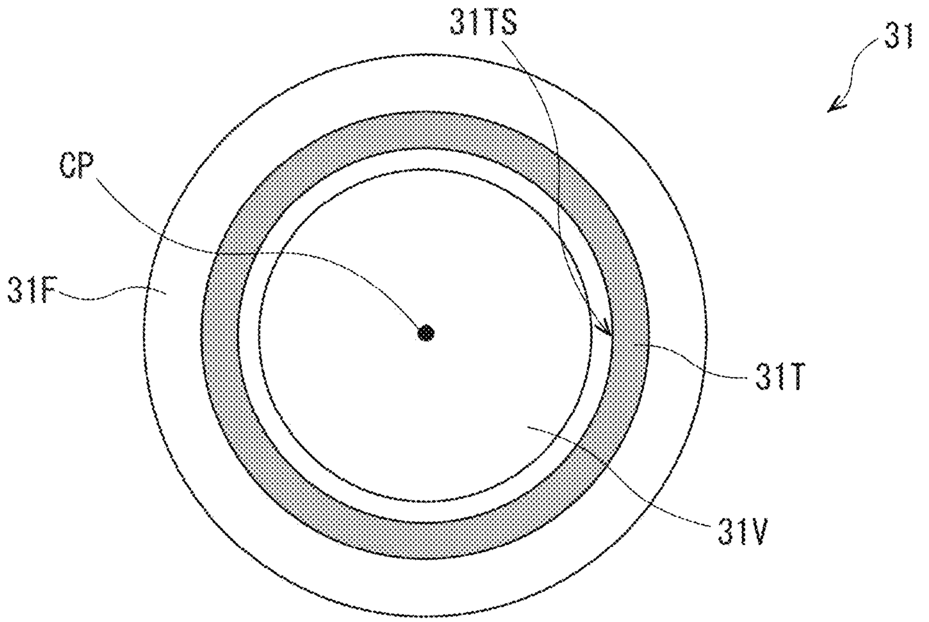
FIG. 7A is a schematic plan diagram of a safety cover illustrated in FIG. 3.
Figure 7B:
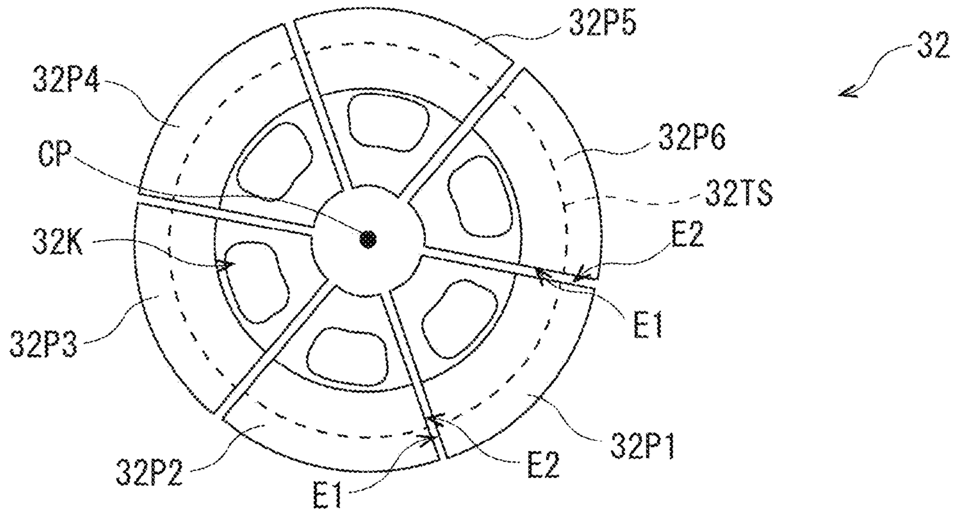
FIG. 7B is a schematic plan diagram of a disk holder illustrated in FIG. 3.
Figure 7C:
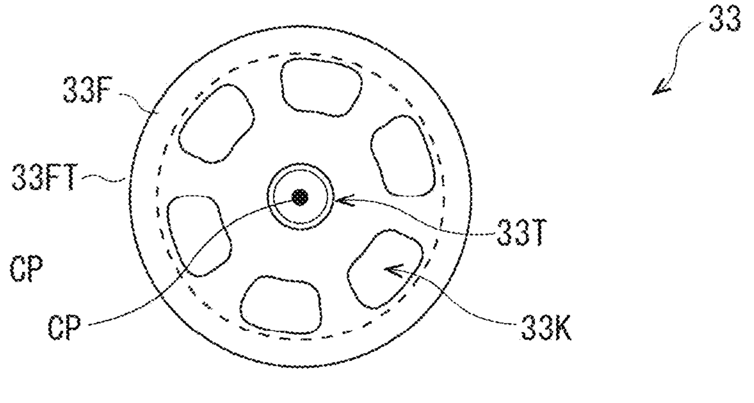
FIG. 7C is a schematic plan diagram of a stripper disk illustrated in FIG. 3.

FIG. 4 is an exploded perspective diagram of the safety valve mechanism 30. FIG. 5 is an exploded sectional diagram of the safety valve mechanism 30. FIG. 6 is a schematic plan diagram illustrating a plan configuration example of the safety valve mechanism 30, along a horizontal pane orthogonal to the Z direction. FIG. 7A is a schematic plan diagram of the safety cover 31 illustrated in FIG. 3. FIG. 7B is a schematic plan diagram of the disk holder 32 illustrated in FIG. 3. FIG. 7C is a schematic plan diagram of the stripper disk 33 illustrated in FIG. 3.

As illustrated in FIG. 2, the safety cover 31 is an adjacent member adjacent to a bottom surface 14BS of the battery cover 14. The safety cover 31 is cleavable in part, in response to an increase in the internal pressure of the battery can 11. As illustrated in FIGS. 4, 5, and 7A, the safety cover 31 includes a valve part 31V in the middle region thereof. The valve part 31V is cleavable in response to an increase in the internal pressure of the battery can 11. When the safety cover 31 cleaves, the valve part 31V may cleave in part or the entire valve part 31V may break. The safety cover 31 further includes an annular protruding part 31T that extends to surround the valve part 31V. The annular protruding part 31T includes an abutting surface 31TS on an inner side thereof in the R direction that is the radial direction. The abutting surface 31TS abuts against an abutting surface 32TS of the disk holder 32, as will be described later. Note that the annular protruding part 31T is hollow inside. A reason for this is that the annular protruding part 31T is provided by a portion of the disk holder 32 being bent to have a substantially U-shaped section. That is, a groove 31U having a circular annular shape is provided in a top surface of the safety cover 31, as illustrated in FIG. 5. Because the annular protruding part 31T is hollow inside, when the annular protruding part 31T is so crimped as to bias insulating pieces 32P in the R direction, the annular protruding part 31T is easily plastically deformed. The safety cover 31 further includes a flange part 31F. The flange part 31F is a circular annular portion that is positioned on an outer side in the R direction when viewed from the annular protruding part 31T and extends along a horizontal plane orthogonal to the Z direction. The flange part 31F overlaps with the bottom surface 14BS of the battery cover 14 in the Z direction. The safety cover 31 includes any one or more of electrically conductive materials including, without limitation, a metal material. Specific examples of the metal material include aluminum and an aluminum alloy.

A planar shape of the safety cover 31 is not particularly limited, and is specifically circular, for example. The "planar shape" refers to a shape along a horizontal plane orthogonal to the Z direction. Hereinafter, the above-described definition of the planar shape is similarly applicable.

The safety cover 31 is a specific example corresponding to a "valve member" of the disclosure, and the valve part 31V is a specific example corresponding to a "valve part" of the disclosure.

The disk holder 32 is a member that is interposed between the safety cover 31 and the stripper disk 33 to align the stripper disk 33 with respect to the safety cover 31 and so hold the stripper disk 33 as to fix the stripper disk 33 to the safety cover 31. The disk holder 32 includes any one or more of insulating materials including, without limitation, a polymer material. Specific examples of the polymer material include polypropylene (PP) and polybutylene terephthalate (PBT).

A planar shape of the disk holder 32 is not particularly limited, and is specifically circular, for example. The disk holder 32 has a through hole 32H in a middle part thereof, at a position corresponding to that of a projecting part 33T of the stripper disk 33. An opening shape of the through hole 32H is not particularly limited, and is specifically circular, for example. The through hole 32H allows the projecting part 33T of the stripper disk 33 to be disposed therein.

The disk holder 32 includes the insulating pieces 32P into which the disk holder 32 is divided in a circling direction in which the annular protruding part 31T extends. The insulating pieces 32P are provided along the horizontal plane orthogonal to the Z direction. The insulating pieces 32P have respective openings 32K provided through the corresponding ones of the insulating pieces 32P in the Z direction. The openings 32K are each a vent adapted to release the gas generated inside the battery can 11 to an outside. The openings 32K are provided at respective positions corresponding, in the Z direction, to those of openings 33K of the stripper disk 33 which will be described later. That is, the openings 32K are each in communication with corresponding one of the openings 33K. The number of the insulating pieces 32P is not particularly limited, but is preferably greater than or equal to 3 and less than or equal to 6. A reason for this is that when the number of the insulating pieces 32P included in the disk holder 32 is greater than or equal to 3, the stripper disk 33 is held stably and firmly, as compared with when the number of the insulating pieces 32P is 2. In addition, when the number of the insulating pieces 32P included in the disk holder 32 is less than or equal to 6, it is possible to secure a sufficient opening area, as compared with when the number of the insulating pieces 32P is greater than or equal to 7. As used herein, the opening area refers to an area of a cleavable region of the safety cover 31, that is, a region in which all of a region occupied by the valve part 31V, a region occupied by the openings 32K, and a region occupied by the openings 33K overlap with each other in the Z direction. In addition, it is preferable that the insulating pieces 32P be substantially the same as each other in size and shape. FIGS. 3 to 7B each illustrate a case where the disk holder 32 includes six insulating pieces 32P1 to 32P6. The insulating pieces 32P1 to 32P6 are so disposed around the central axis CP as to form a circular annular shape as a whole. Accordingly, the insulating pieces 32P are disposed to surround the projecting part 33T, which is disposed in the through hole 32H, along the horizontal plane. The insulating pieces 32P each include an abutting part 32T. The abutting part 32T is positioned on an inner side of the annular protruding part 31T in the R direction of the battery can 11, that is, on a central axis CP side when viewed from the annular protruding part 31T, and abuts against the annular protruding part 31T.

As illustrated in FIGS. 3 and 5, the insulating pieces 32P each further include a flange part 32F. The flange part 32F is positioned on the outer side in the R direction when viewed from the corresponding abutting part 32T, that is, on an opposite side to the central axis CP when viewed from the corresponding abutting part 32T, and extends along the horizontal plane orthogonal to the Z direction. The flange part 32F is opposed to an apex part of the annular protruding part 31T of the safety cover 31. The abutting part 32T includes the abutting surface 32TS abutting against the annular protruding part 31T. The abutting surface 32TS is inclined toward the outer side in the R direction, with respect to the Z direction. That is, when viewed from an outer side of the corresponding abutting part 32T in the R direction, the abutting surface 32TS is an inclined surface that has an overhang shape in which a distance from the central axis CP increases with increasing distance from the corresponding flange part 32F. The abutting surface 32TS and the corresponding flange part 32F form an angle, for example, within a range from about 10° to about 40°.

As illustrated in FIGS. 3 and 5, the abutting part 32T of each of the insulating pieces 32P includes a lateral groove 32U expanding along the horizontal plane. The lateral groove 32U extends toward the outer side in the R direction from an open end facing an inner side in the R direction. The lateral groove 32U allows a flange part 33 of the stripper disk 33 to be disposed therein and is thereby engaged with the flange part 33. The flange part 33 will be described later. Note that an inside of the lateral groove 32U is provided with a locking surface 32US, as illustrated in FIG. 5. The locking surface 32US locks an outermost edge 33FT of the stripper disk 33. The outermost edge 33FT will be described later.

As illustrated in FIG. 7B, the insulating pieces 32P each include border surfaces E1 and E2 extending in the R direction of the battery can 11. The insulating pieces 32P are disposed adjacent to each other with each of the border surfaces E1 and corresponding one of the border surfaces E2 being opposed to each other. For example, the border surface E1 of the insulating piece 32P1 is opposed to the border surface E2 of the insulating piece 32P2, and the border surface E2 of the insulating piece 32P1 is opposed to the border surface E1 of the insulating piece 32P6. Thus, the border surfaces E1 and E2 extend radially from the central axis CP serving as the center. The disk holder 32 is a specific example corresponding to an "insulating holder member" of the disclosure, and the insulating pieces 32P are specific examples of "insulating pieces" of the disclosure.

The stripper disk 33 is a member that releases the gas generated inside the battery can 11. The stripper disk 33 is configured to be separated from the safety cover 31 when the internal pressure of the secondary battery increases. The stripper disk 33 being separated from the safety cover 31 cuts off conduction between the stripper disk 33 and the safety cover 31, which blocks a current inside the secondary battery. The stripper disk 33 includes any one or more of electrically conductive materials including, without limitation, a metal material. Specific examples of the metal material include aluminum and an aluminum alloy. The stripper disk 33 is a specific example corresponding to an "electrically conductive member" of the disclosure.

A planar shape of the stripper disk 33 is not particularly limited, and is specifically circular, for example. The stripper disk 33 is provided with the projecting part 33T in a middle part thereof. The projecting part 33T is bent and protrudes toward the safety cover 31. The projecting part 33T is disposed in the through hole 32H of the disk holder 32 and electrically coupled to the valve part 31V of the safety cover 31 to provide a coupling part 30C. When the internal pressure of the secondary battery increases, the valve part 31V is deformed, which allows the projecting part 33T to be separated from the valve part 31V.

The stripper disk 33 overlaps with the safety cover 31 in the Z direction, and is positioned on an inner side of the abutting part 32T of each of the insulating pieces 32P in the R direction. More specifically, as illustrated in FIGS. 3 to 5, the stripper disk 33 further includes the flange part 33F. The flange part 33F includes the outermost edge 33FT of the stripper disk 33 illustrated in FIG. 5, and extends along the horizontal plane orthogonal to the Z direction. The flange part 33F is disposed in the lateral groove 32U provided in the abutting part 32T of each of the insulating pieces 32P. The flange part 33F is held by each of the insulating pieces 32P, by being disposed in each of the lateral grooves 32U. In addition, the outermost edge 33FT of the flange part 33F abutting against an inner wall surface of each of the lateral grooves 32U applies, to the stripper disk 33, biasing force along the R direction, toward the central axis CP.

The stripper disk 33 has the openings 33K that are each provided through the stripper disk 33 in the Z direction. The openings 33K are provided at respective positions corresponding to those of the openings 32K of the disk holder 32. That is, the openings 33K are each in communication with corresponding one of the openings 32K, as described above. The openings 33K are each a vent adapted to release the gas generated inside the battery can 11 to the outside.

Figure 8:
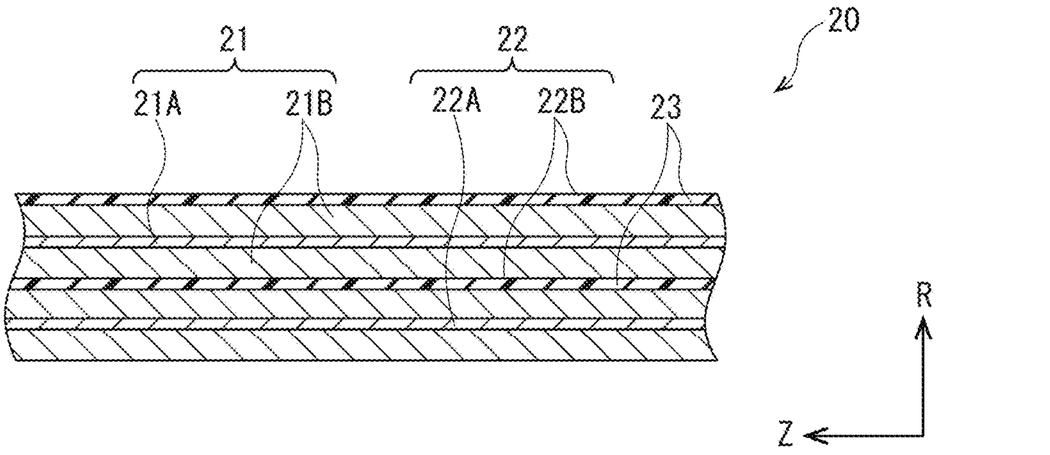
FIG. 8 is a sectional diagram illustrating, in an enlarged manner, a portion of a configuration of a battery device illustrated in FIG. 1.

FIG. 8 illustrates, in an enlarged manner, a portion of a sectional configuration of the battery device 20 illustrated in FIG. 1. The battery device 20 includes the positive electrode 21, the negative electrode 22, the separator 23, and the electrolytic solution, as described above.

The positive electrode 21 includes, as illustrated in FIG. 8, a positive electrode current collector 21A and a positive electrode active material layer 21B.

The positive electrode current collector 21A has two opposed surfaces on each of which the positive electrode active material layer 21B is to be provided. The positive electrode current collector 21A includes an electrically conductive material such as a metal material. Specific examples of the metal material include aluminum.

In an example illustrated in FIG. 8, the positive electrode active material layer 21B is provided on each of the two opposed surfaces of the positive electrode current collector 21A. The positive electrode active material layer 21B includes any one or more of positive electrode active materials into which lithium is insertable and from which lithium is extractable. Note that the positive electrode active material layer 21B may be provided only on one of the two opposed surfaces of the positive electrode current collector 21A, on a side on which the positive electrode 21 is opposed to the negative electrode 22. In addition, the positive electrode active material layer 21B may further include materials including, without limitation, a positive electrode binder and a positive electrode conductor. A method of forming the positive electrode active material layer 21B is not particularly limited, and is specifically a method such as a coating method.

The positive electrode active material includes a lithium compound. The lithium compound is a compound including lithium as a constituent element, and is more specifically a compound including lithium and one or more transition metal elements as constituent elements. A reason for this is that a high energy density is obtainable. Note that the lithium compound may further include any one or more of other elements, i.e., elements other than lithium and the transition metal elements.

The lithium compound is not limited to a particular kind, and specific examples thereof include a lithium composite oxide having a layered rock-salt crystal structure, a lithium composite oxide having a spinel crystal structure, and a lithium phosphoric acid compound having an olivine crystal structure. Specific examples of the lithium composite oxide having the layered rock-salt crystal structure include $LiNiO_2$, $LiNi_{0.8}Co_{0.15}Al_{0.05}$, and $LiCoO_2$. Specific examples of the lithium composite oxide having the spinel crystal structure include $LiMn_2O_4$. Specific examples of the lithium phosphoric acid compound having the olivine crystal structure include $LiFePO_4$ and $LiMnPO_4$.

In particular, the positive electrode active material preferably includes the lithium phosphoric acid compound having the olivine crystal structure. A reason for this is that, because the crystal structure of the lithium phosphoric acid compound having the olivine crystal structure is thermally stable, the secondary battery is prevented from easily exhibiting thermal runaway due to a cause such as overcharging or an internal short circuit. Another reason is that, because the crystal structure of the lithium phosphoric acid compound having the olivine crystal structure is firm, the battery capacity is prevented from decreasing easily even if the secondary battery is charged and discharged repeatedly.

The positive electrode binder includes any one or more of materials including, without limitation, a synthetic rubber and a polymer compound. Examples of the synthetic rubber include a styrene-butadiene-based rubber. Examples of the polymer compound include polyvinylidene difluoride.

The positive electrode conductor includes any one or more of electrically conductive materials including, without limitation, a carbon material. Examples of the carbon material include graphite, carbon black, acetylene black, and Ketjen black. The electrically conductive material may be a metal material or a polymer compound, for example.

The negative electrode 22 includes, as illustrated in FIG. 8, a negative electrode current collector 22A and a negative electrode active material layer 22B.

The negative electrode current collector 22A has two opposed surfaces on each of which the negative electrode active material layer 22B is to be provided. The negative electrode current collector 22A includes an electrically conductive material such as a metal material. Specific examples of the metal material include copper.

Here, the negative electrode active material layer 22B is provided on each of the two opposed surfaces of the negative electrode current collector 22A. The negative electrode active material layer 22B includes any one or more of negative electrode active materials into which lithium is insertable and from which lithium is extractable. Note that the negative electrode active material layer 22B may be provided only on one of the two opposed surfaces of the negative electrode current collector 22A, on a side on which the negative electrode 22 is opposed to the positive electrode 21. In addition, the negative electrode active material layer 22B may further include materials including, without limitation, a negative electrode binder and a negative electrode conductor. Details of the negative electrode binder are similar to those of the positive electrode binder. Details of the negative electrode conductor are similar to those of the positive electrode conductor. A method of forming the negative electrode active material layer 22B is not particularly limited, and specifically includes any one or more of methods including, without limitation, a coating method, a vapor-phase method, a liquid-phase method, a thermal spraying method, and a firing (sintering) method.

The negative electrode active material includes a carbon material, a metal-based material, or both, for example. A reason for this is that a high energy density is obtainable. Examples of the carbon material include graphitizable carbon, non-graphitizable carbon, and graphite (natural graphite and artificial graphite). The metal-based material is a material that includes, as one or more constituent elements, any one or more elements among metal elements and metalloid elements that are each able to form an alloy with lithium. Specific examples of such metal elements and metalloid elements include silicon, tin, or both. Note that the metal-based material may be a simple substance, an alloy, a compound, a mixture of two or more thereof, or a material including two or more phases thereof. Specific examples of the metal-based material include $TiSi_2$ and $SiO_x$ ($0<x\leq2$ or $0.2<x<1.4$).

The separator 23 is an insulating porous film interposed between the positive electrode 21 and the negative electrode 22 as illustrated in FIG. 8. The separator 23 allows lithium ions to pass therethrough while preventing a short circuit between the positive electrode 21 and the negative electrode 22. The separator 23 includes a polymer compound such as polyethylene.

The electrolytic solution includes a solvent and an electrolyte salt. The solvent includes any one or more of non-aqueous solvents (organic solvents) including, without limitation, a carbonic-acid-ester-based compound, a carboxylic-acid-ester-based compound, and a lactone-based compound. An electrolytic solution including any of the non-aqueous solvents is what is called a non-aqueous electrolytic solution. However, the solvent may be an aqueous solvent. The electrolyte salt includes any one or more of light metal salts including, without limitation, a lithium salt. A content of the electrolyte salt is not particularly limited, and is preferably within a range from 0.3 mol/kg to 3 mol/kg both inclusive with respect to the solvent, in particular. A reason for this is that high ion conductivity is obtainable.

Figure 9:
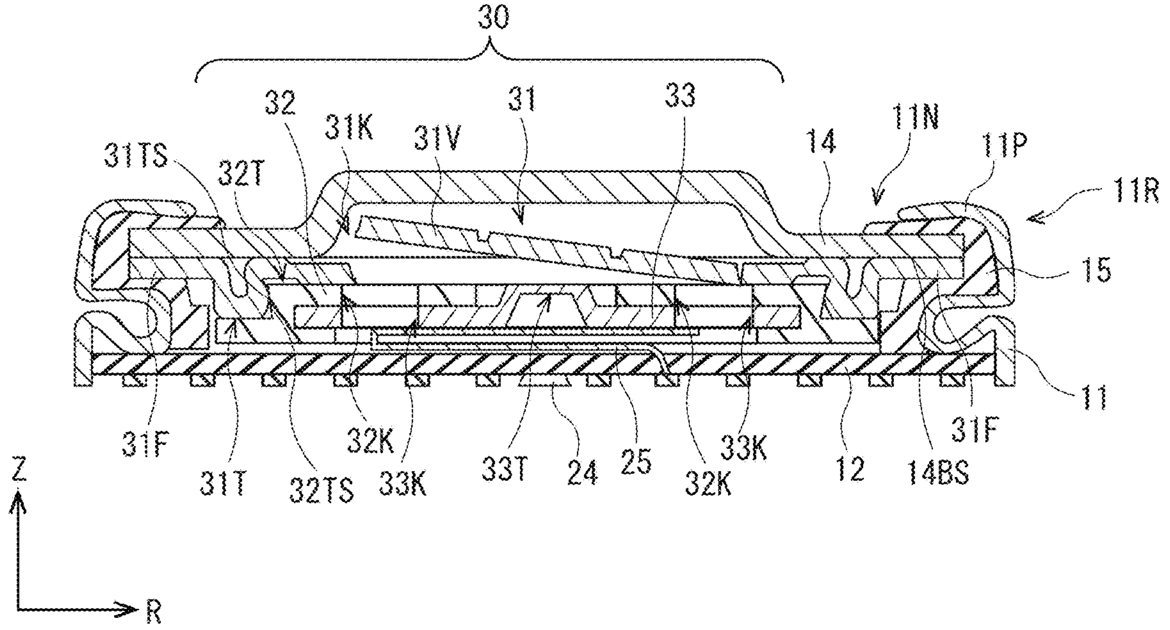
FIG. 9 is a sectional diagram for describing an operation of the secondary battery.

FIG. 9 is an explanatory diagram for describing an operation of the secondary battery of the embodiment, specifically, behavior of the secondary battery at a time when the internal pressure increases. FIG. 9 illustrates a sectional configuration corresponding to FIG. 2.

In the following, an operation at the time of charging and discharging will be described, and thereafter, the operation at the time when the internal pressure increases will be described. In this case, reference is also made to FIG. 2 in addition to FIG. 9 where appropriate.

Upon charging, in the battery device 20, lithium is extracted from the positive electrode 21, and the extracted lithium is inserted into the negative electrode 22 via the electrolytic solution. Upon discharging, in the battery device 20, lithium is extracted from the negative electrode 22, and the extracted lithium is inserted into the positive electrode 21 via the electrolytic solution. Upon such charging and discharging, lithium is inserted and extracted in an ionic state.

Upon charging and discharging of the secondary battery, when the internal pressure of the battery can 11 increases, the safety valve mechanism 30 operates in order to prevent the secondary battery from, for example, rupturing or being damaged.

Specifically, upon a normal operation of the secondary battery, the valve part 31V of the safety cover 31 has not yet cleaved, as illustrated in FIG. 2. Therefore, the openings 33K of the stripper disk 33 are closed by the safety cover 31.

When a gas is generated inside the battery can 11 due to a side reaction such as a decomposition reaction of the electrolytic solution, the generated gas is accumulated inside the battery can 11, and the internal pressure of the battery can 11 increases. Here, when the internal pressure of the battery can 11 reaches a certain level or higher, the valve part 31V of the safety cover 31 cleaves in part, as illustrated in FIG. 9. This provides an opening 31K in the safety cover 31, which opens a gas releasing path using the openings 32K, 33K, and 31K. As a result, the gas generated inside the battery can 11 is released through the openings 32K, 33K, and 31K. In addition, the valve part 31V of the safety cover 31 is separated from the projecting part 33T of the stripper disk 33. This cuts off the conduction between the stripper disk 33 and the safety cover 31, and blocks the current inside the secondary battery.

Note that depending on the level of the internal pressure of the secondary battery, the bent part 11P is deformed, and the crimped structure 11R is therefore broken. As a result, the battery cover 14 is detached from the battery can 11, and the gas is thus released to the outside of the secondary battery.

Figure 10A:
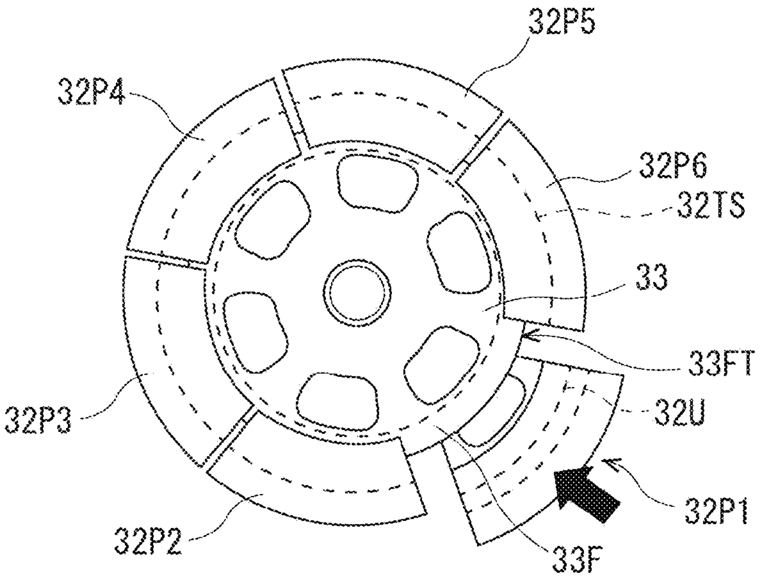
FIG. 10A is a schematic plan diagram illustrating a process in a manufacturing method of the safety valve mechanism illustrated in FIG. 3.
Figure 10B:
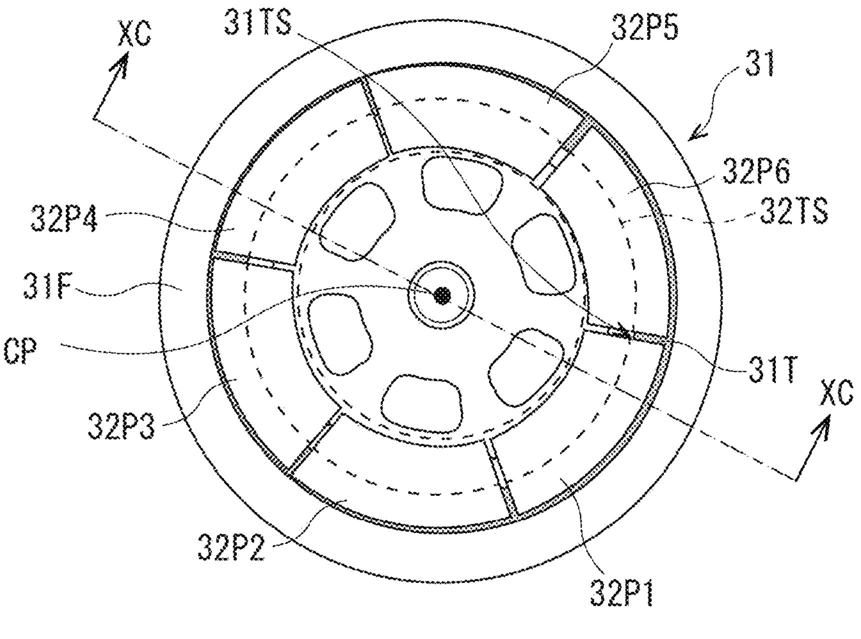
FIG. 10B is a schematic plan diagram illustrating a process following that in FIG. 10A.
Figure 10C:
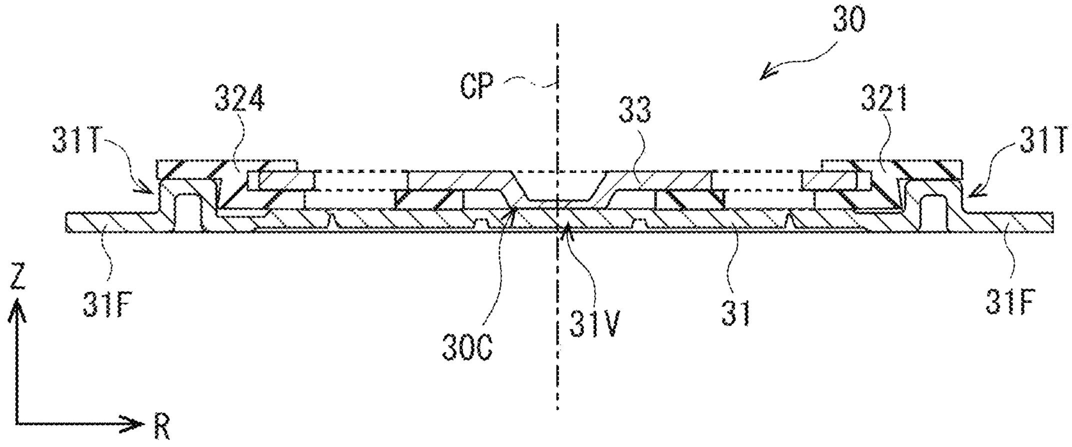
FIG. 10C is a schematic sectional diagram illustrating a process corresponding to that in FIG. 10B.
Figure 10D:
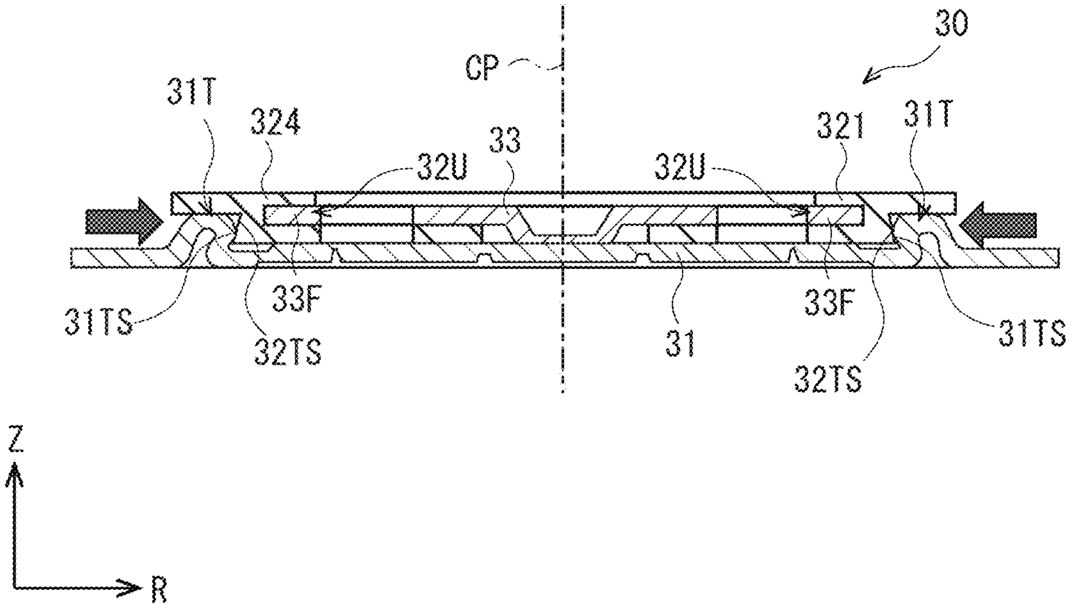
FIG. 10D is a schematic plan diagram illustrating a process following that in FIG. 10C.

FIGS. 10A and 10B are each a schematic plan diagram for describing a process of manufacturing the safety valve mechanism 30 of the secondary battery of an embodiment, and each correspond to FIG. 8. FIGS. 10C and 10D are each a schematic sectional diagram for describing a process of manufacturing the safety valve mechanism 30 of the secondary battery of an embodiment, and each correspond to FIG. 3. Note that FIG. 10C corresponds to a section in an arrow direction along a cutting line XC-XC illustrated in FIG. 10B.

First, the positive electrode active material is mixed with materials including, without limitation, the positive electrode binder and the positive electrode conductor on an as-needed basis to thereby obtain a positive electrode mixture. Thereafter, the positive electrode mixture is dispersed in a solvent to thereby obtain a positive electrode mixture slurry in paste form. The solvent is not limited to a particular kind, and may therefore be an aqueous solvent or a non-aqueous solvent (an organic solvent). Thereafter, the positive electrode mixture slurry is applied on the two opposed surfaces of the positive electrode current collector 21A to thereby form the positive electrode active material layers 21B. Lastly, the positive electrode active material layers 21B are compression-molded by means of, for example, a roll pressing machine. In this case, the positive electrode active material layers 21B may be heated. The positive electrode active material layers 21B may be compression-molded multiple times. In this manner, the positive electrode active material layers 21B are formed on the respective two opposed surfaces of the positive electrode current collector 21A. Thus, the positive electrode 21 is fabricated.

The negative electrode active material layers 22B are formed on the respective two opposed surfaces of the negative electrode current collector 22A by a procedure similar to that of the positive electrode 21 described above. Specifically, the negative electrode active material is mixed with materials including, without limitation, the negative positive electrode binder and the negative electrode conductor to thereby obtain a negative electrode mixture. Thereafter, the negative electrode mixture is dispersed in a solvent to thereby obtain a negative electrode mixture slurry in paste form. Details of the solvent are as described above. Thereafter, the negative electrode mixture slurry is applied on the two opposed surfaces of the negative electrode current collector 22A to thereby form the negative electrode active material layers 22B. Lastly, the negative electrode active material layers 22B are compression-molded by means of, for example, a roll pressing machine. Details of compression molding are as described above. In this manner, the negative electrode active material layers 22B are formed on the respective two opposed surfaces of the negative electrode current collector 22A. Thus, the negative electrode 22 is fabricated.

First, the positive electrode lead 25 is coupled to the positive electrode current collector 21A of the positive electrode 21 by a method such as a welding method. In a similar manner, the negative electrode lead 26 is coupled to the negative electrode current collector 22A of the negative electrode 22 by a method such as a welding method. Thereafter, the positive electrode 21 and the negative electrode 22 are stacked on each other with the separator 23 interposed therebetween to form a stacked body, following which the obtained stacked body is wound to thereby form a wound body having the center space 20C. The wound body has a configuration similar to that of the battery device 20 except that the positive electrode 21, the negative electrode 22, and the separator 23 are each not impregnated with the electrolytic solution. Thereafter, the center pin 24 is placed in the center space 20C of the wound body.

Thereafter, the battery can 11 is prepared, following which the insulating plates 12 and 13 are opposed to each other with the wound body interposed therebetween, and the wound body, together with the insulating plates 12 and 13, is placed inside the battery can 11. In this case, the positive electrode lead 25 is coupled to the safety valve mechanism 30 by a method such as a welding method, and the negative electrode lead 26 is coupled to the battery can 11 by a method such as a welding method.

Thereafter, the electrolytic solution is injected into the battery can 11 to thereby impregnate the wound body with the electrolytic solution. Thus, the positive electrode 21, the negative electrode 22, and the separator 23 are each impregnated with the electrolytic solution, and the battery device 20 is fabricated. Thereafter, the battery cover 14 and the safety valve mechanism 30 are placed inside the battery can 11 together with the gasket 15.

The safety valve mechanism 30 is fabricable as follows. First, as illustrated in FIG. 10A, the insulating pieces 32P1 to 32P6 are disposed along the outermost edge 33FT of the stripper disk 33. At this time, the flange part 33F of the stripper disk 33 is placed into the lateral groove 32U of each of the insulating pieces 32P1 to 32P6.

Thereafter, as illustrated in FIG. 10B, the safety cover 31 provided with the annular protruding part 31T is prepared, and the insulating pieces 32P1 to 32P6 and the stripper disk 33 are disposed on the inner side of the annular protruding part 31T. At this time, the projecting part 33T of the stripper disk 33 is coupled to a middle region of the valve part 31V of the safety cover 31 to form the coupling part 30C. At this stage, as illustrated in FIG. 10C, the annular protruding part 31T is not yet deformed, and stands in a direction substantially perpendicular to the horizontal plane on which the flange part 31F extends, i.e., in the Z direction.

Thereafter, as indicated by an arrow in FIG. 10D, stress is applied to the annular protruding part 31T along the R direction toward the central axis CP to thereby crimp the annular protruding part 31T. At this time, the annular protruding part 31T is so deformed as to incline toward the central axis CP, which brings the abutting surface 31TS into close contact with the abutting surface 32TS of each of the insulating pieces 32P1 to 32P6. The abutting surface 32TS being biased by the abutting surface 31TS of the annular protruding part 31T causes each of the insulating pieces 32P1 to 32P6 to slide along the R direction toward the central axis CP. As a result, the stripper disk 33 is biased from six different directions toward the central axis CP along the R direction, and thereby firmly held by the safety cover 31 with the insulating pieces 32P1 to 32P6 interposed therebetween. In such a manner, the safety cover 31, the disk holder 32, and the stripper disk 33 are integrated with each other as illustrated in FIG. 6, etc., and the safety valve mechanism 30 is thus fabricated.

Lastly, the open end part 11N and both the battery cover 14 and the safety valve mechanism 30 are crimped to each other with the gasket 15 interposed therebetween at the open end part 11N of the battery can 11, as illustrated in FIG. 1. In such a manner, the bent part 11P is formed, and the crimped structure 11R is therefore formed. As a result, the battery can 11 is closed by the battery cover 14, and the assembly of the secondary battery is finished.

The assembled secondary battery is charged and discharged. Various conditions including, for example, an environment temperature, the number of times of charging and discharging (the number of cycles), and charging and discharging conditions may be set as desired. A film is thereby formed on a location such as a location on a surface of the negative electrode 22. This brings the secondary battery into an electrochemically stable state. As a result, the secondary battery of the cylindrical type is completed in which the battery device 20 and other components are sealed inside the battery can 11.

In the secondary battery of an embodiment, it is possible to configure the safety valve mechanism 30 with at least the safety cover 31, the disk holder 32, and the stripper disk 33. The disk holder 32 includes the insulating pieces 32P into which the disk holder 32 is divided in the circling direction surrounding the valve part 31V of the safety cover 31. The respective abutting parts 32T of the insulating pieces 32P abut against the inner side of the annular protruding part 31T of the safety cover 31. The stripper disk 33 is positioned on the inner side of each of the abutting surfaces 32TS in the R direction. Such a configuration allows the safety cover 31 and the stripper disk 33 to be firmly held by the disk holder 32. As a result, vibration resistance performance of the secondary battery improves.

In the secondary battery of an embodiment, the safety valve mechanism 30 is provided without using another component such as the sub-disk. That is, the configuration of the safety valve mechanism 30 is simplified and reduced in thickness. Note that in the safety valve mechanism 30, cleaving of a portion of the valve part 31V or the entire valve part 31V allows the valve part 31V and the projecting part 33T to be separated from each other, which makes it possible to block a current. It is also possible to swiftly release the gas generated inside the secondary battery to the outside. Accordingly, the safety valve mechanism 30 makes it possible to secure high safety despite a simple configuration.

Further, the disk holder 32 includes the insulating pieces 32P into which the disk holder 32 is divided in the circling direction surrounding the central axis CP. Therefore, upon assembly of the safety valve mechanism 30, when the safety cover 31 and the stripper disk 33 are fixed to each other with the disk holder 32 interposed therebetween by tightening the annular protruding part 31T in the R direction, each of the insulating pieces 32P is smoothly movable in the R direction. The disk holder 32 being divided into the insulating pieces 32P makes it possible to increase an amount of movement in the R direction. In addition, compressing the annular protruding part 31T in the R direction toward the central axis CP allows for the assembly of the safety valve mechanism 30. This makes an existing manufacturing method including resin molding unnecessary, allowing for simpler manufacturing.

Further, in the secondary battery of an embodiment, the abutting surface 32TS abutting against the annular protruding part 31T is inclined toward the outer side in the R direction with respect to the Z direction. Such a configuration limits movement of the disk holder 32 in the Z direction, making it possible for the safety cover 31 to more firmly hold the stripper disk 33 with the disk holder 32 interposed therebetween.

Further, in the secondary battery of an embodiment, the flange part 33F of the stripper disk 33 is disposed in each of the lateral grooves 32U of the respective insulating pieces 32P. The lateral grooves 32U each extend toward the outer side in the R direction from the open end facing the inner side in the R direction, and each include the locking surface 32US inside. Disposing the flange part 33F in each of the lateral grooves 32U makes it possible to limit movement of the stripper disk 33 in the Z direction. In addition, the locking surface 32US locking the outermost edge 33FT of the flange part 33F makes it possible to limit the movement of the stripper disk 33 in the R direction. Accordingly, it is possible for the safety cover 31 to further more firmly hold the stripper disk 33 with the disk holder 32 interposed therebetween.

Further, in the secondary battery of an embodiment, the openings 33K of the stripper disk 33 are provided at the respective positions corresponding, in the Z direction, to those of the openings 32K of the respective insulating pieces 32P. This makes it possible to increase the opening area, making it possible to further more swiftly release the gas generated inside the secondary battery to the outside.

Further, the positive electrode 21 may include the lithium phosphoric acid compound having the olivine crystal structure. This prevents the secondary battery from easily exhibiting the thermal runaway, and also prevents the battery capacity from easily decreasing even if the secondary battery is repeatedly charged and discharged. It is therefore possible to achieve higher operation reliability. The positive electrode 21 may include a nickel-cobalt composite oxide of a layered rock-salt crystal structure. This makes it possible to obtain a battery superior in balance between a large output characteristic and an energy density.

Further, the secondary battery may include a lithium-ion secondary battery. This makes it possible to obtain a sufficient battery capacity stably through the use of insertion and extraction of lithium. It is therefore possible to achieve higher operation reliability.

The configuration of the secondary battery is appropriately modifiable as described below according to an embodiment. Note that any two or more of the following series of modifications may be combined with each other.

In an embodiment described above, the separator 23 that is a porous film is used. However, the secondary battery of the disclosure may include a separator of a stacked type including a polymer compound layer, instead of the separator 23 that is the porous film.

Specifically, the separator of the stacked type includes a porous film having two opposed surfaces, and the polymer compound layer disposed on one of or each of the two opposed surfaces of the porous film. This improves adherence of the separator to each of the positive electrode 21 and the negative electrode 22, and therefore suppresses misalignment (winding displacement of each of the positive electrode 21, the negative electrode 22, and the separator) of the battery device 20. Accordingly, swelling of the secondary battery is suppressed, even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include any one or more kinds of insulating particles. A reason for this is that the insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator of the stacked type, a precursor solution including, without limitation, the polymer compound and an organic solvent is prepared, following which the precursor solution is applied on one of or each of the two opposed surfaces of the porous film. In this case, the insulating particles may be added to the precursor solution.

In the case where the separator of the stacked type is used also, lithium ions are movable between the positive electrode 21 and the negative electrode 22, and similar effects are therefore obtainable.

In an embodiment described above, the electrolytic solution that is a liquid electrolyte is used. However, the secondary battery of the disclosure may include an electrolyte layer that is a gel electrolyte, instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that the leakage of the electrolytic solution is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and an organic solvent is prepared, following which the precursor solution is applied on one side or both sides of the positive electrode 21 and on one side or both sides of the negative electrode 22.

In a case where the electrolyte layer is used also, lithium ions are movable between the positive electrode 21 and the negative electrode 22 via the electrolyte layer, and similar effects are therefore obtainable.

Next, a description is given of applications (application examples) of the secondary battery according to an embodiment.

The applications of the secondary battery are not particularly limited. The secondary battery used as a power source serves as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include battery systems for home use or industrial use, for accumulation of electric power for a situation such as emergency. In each of the above-described applications, one secondary battery may be used, or multiple secondary batteries may be used.

The battery packs may each include a single battery, or may each include an assembled battery. The electric vehicle is a vehicle that operates (travels) using the secondary battery as a driving power source, and may be a hybrid automobile that is additionally provided with a driving source other than the secondary battery. In an electric power storage system for home use, electric power accumulated in the secondary battery which is an electric power storage source may be utilized for using, for example, home appliances.

An application example of the secondary battery will now be described in detail. The configuration of the application example described below is merely an example, and is appropriately modifiable.

Figure 11:
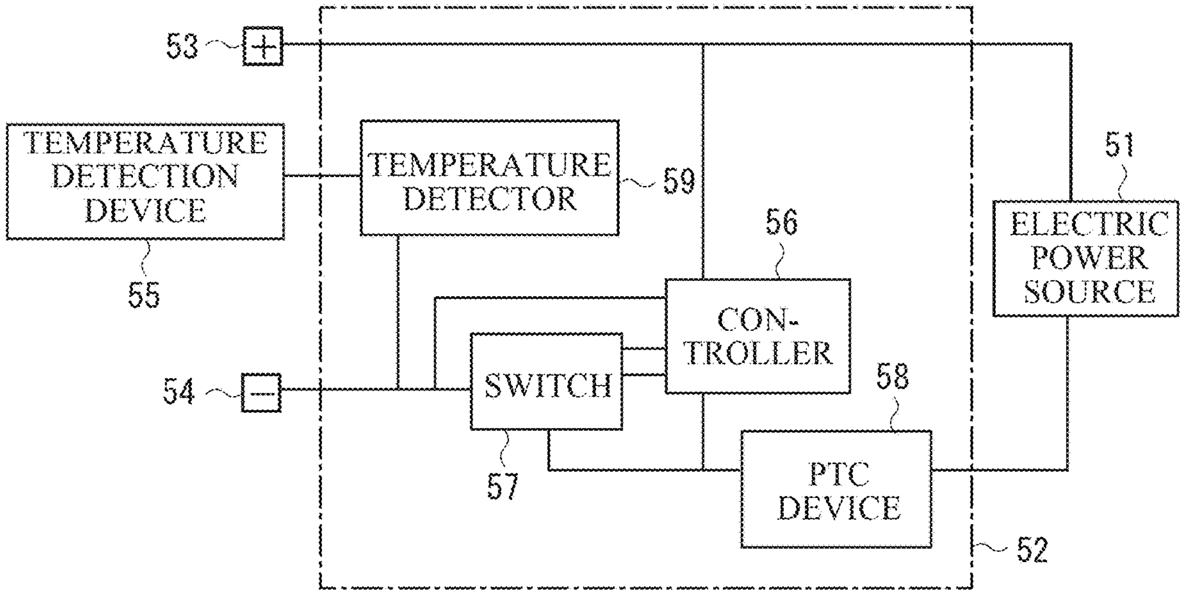
FIG. 11 is a block diagram illustrating a configuration of an application example of the secondary battery, which is a battery pack.

FIG. 11 illustrates a block configuration of a battery pack. The battery pack described here is a battery pack (what is called a soft pack) including one secondary battery, and is to be mounted on, for example, electronic equipment typified by a smartphone.

As illustrated in FIG. 11, the battery pack includes an electric power source 51 and a circuit board 52. The circuit board 52 is coupled to the electric power source 51, and includes a positive electrode terminal 53, a negative electrode terminal 54, and a temperature detection terminal 55.

The electric power source 51 includes one secondary battery. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable. The circuit board 52 includes a controller 56, a switch 57, a thermosensitive resistive device (a PTC device) 58, and a temperature detector 59. However, the PTC device 58 may be omitted.

The controller 56 includes, for example, a central processing unit (CPU) and a memory, and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. For example, the overcharge detection voltage is 4.2 V±0.05 V and the overdischarge detection voltage is 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected based on an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge/discharge control upon abnormal heat generation or in a case where the controller 56 performs a correction process upon calculating a remaining capacity.

EXAMPLES

A description is given of Examples of the present technology according to an embodiment.

Examples 1-1 to 1-4

Secondary batteries were fabricated, following which the secondary batteries were each evaluated for a battery characteristic.

[Fabrication of Secondary Battery]

The lithium-ion secondary batteries of the cylindrical type illustrated in FIG. 1 (having a diameter, i.e., an outer diameter of 21 mm, and a length of 70 mm) were fabricated in accordance with the following procedure.

(Fabrication of Positive Electrode)

First, 94 parts by mass of the positive electrode active material ($LiNi_{0.8}Co_{0.15}Al_{0.05}$), 3 parts by mass of the positive electrode binder (polyvinylidene difluoride), and 3 parts by mass of the positive electrode conductor (graphite) were mixed with each other to thereby obtain a positive electrode mixture. Thereafter, the positive electrode mixture was put into a solvent (N-methyl-2-pyrrolidone as the organic solvent), following which the organic solvent was stirred to thereby prepare a positive electrode mixture slurry in paste form. Thereafter, the positive electrode mixture slurry was applied on the two opposed surfaces of the positive electrode current collector 21A (a band-shaped aluminum foil having a thickness of 15 μm) by means of a coating apparatus, following which the applied positive electrode mixture slurry was dried to thereby form the positive electrode active material layers 21B. Lastly, the positive electrode active material layers 21B were compression-molded by means of a roll pressing machine.

(Fabrication of Negative Electrode)

First, 95 parts by mass of the negative electrode active material (graphite), 3 parts by mass of the negative electrode binder (styrene-butadiene rubber (SBR)), and 2 parts by mass of the negative electrode conductor (carbon black) were mixed with each other to thereby obtain a negative electrode mixture. Thereafter, the negative electrode mixture was put into a solvent (water), following which the organic solvent was stirred to thereby prepare a negative electrode mixture slurry in paste form. Thereafter, the negative electrode mixture slurry was applied on the two opposed surfaces of the negative electrode current collector 22A (a band-shaped copper foil having a thickness of 15 μm) by means of a coating apparatus, following which the applied negative electrode mixture slurry was dried to thereby form the negative electrode active material layers 22B. Lastly, the negative electrode active material layers 22B were compression-molded by means of a roll pressing machine.

(Preparation of Electrolytic Solution)

The electrolyte salt ($LiPF_6$) was added to the solvent (ethylene carbonate, ethyl methyl carbonate, and dimethyl carbonate), following which the solvent was stirred. In this case, a mixture ratio (a weight ratio) between ethylene carbonate, ethyl methyl carbonate, and dimethyl carbonate in the solvent was set to 20:20:60, and the content of the electrolyte salt was set to 1 mol/kg with respect to the solvent.

(Assembly of Secondary Battery)

First, the positive electrode lead 25 including aluminum was welded to the positive electrode 21 (the positive electrode current collector 21A), and the negative electrode lead 26 including nickel was welded to the negative electrode 22 (the negative electrode current collector 22A). Thereafter, the positive electrode 21 and the negative electrode 22 were stacked on each other with the separator 23 (a porous polyethylene film having a thickness of 16 μm) interposed therebetween, following which the stack of the positive electrode 21, the negative electrode 22, and the separator 23 was wound to thereby fabricate the wound body having the center space 20C. Thereafter, the center pin 24 was placed in the center space 20C of the wound body.

Thereafter, the safety valve mechanism 30 that included the safety cover 31 including aluminum, the disk holder 32 including polybutylene terephthalate (PBT), and the stripper disk 33 including aluminum was prepared. In this case, the number of pieces into which the disk holder 32 was divided, i.e., the number of the insulating pieces 32P, was set within a range from 2 to 7 both inclusive.

Thereafter, the wound body was placed, together with the pair of insulating plates 12 and 13, inside the battery can 11. The battery can 11 included iron and was plated with nickel. The positive electrode lead 25 was welded to the stripper disk 33 of the safety valve mechanism 30, and the negative electrode lead 26 was welded to the battery can 11. Thereafter, the electrolytic solution was injected into the battery can 11 by a reduced-pressure method to thereby cause the wound body to be impregnated with the electrolytic solution.

Thereafter, asphalt was added to a solvent (ethylcyclohexane as an organic solvent), following which the solvent was stirred to thereby prepare a coating solution. Thereafter, the coating solution was applied to the gasket 15 including polypropylene.

Lastly, the open end part 11N of the battery can 11 and both the battery cover 14 and the safety valve mechanism 30 were crimped to each other with the gasket 15 including polypropylene interposed between the open end part 11N and both the battery cover 14 and the safety valve mechanism 30, to thereby form the crimped structure 11R.

In such a manner, the open end part 11N of the battery can 11 was closed by the battery cover 14, and the battery device and other components were placed inside the battery can 11. As a result, the lithium-ion secondary battery of the cylindrical type was assembled.

(Stabilization of Secondary Battery)

The secondary battery was charged and discharged for one cycle in an ambient temperature environment (at a temperature of 23 ° C). Upon charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 3.0 V. Note that 0.1 C was a value of a current that caused a battery capacity (a theoretical capacity) of 4000 mAh to be completely discharged in 10 hours, and 0.05 C was a value of a current that caused the battery capacity of 4000 mAh to be completely discharged in 20 hours.

In this manner, the state of the secondary battery was electrochemically stabilized. The lithium-ion secondary battery of the cylindrical type was thus completed.

[Evaluation of Battery Characteristic]

The secondary batteries were each subjected to a vibration test and a projectile test according to UL 1642, and evaluated in terms of performance by the following procedure, which revealed the results presented in Table 1.

(Vibration Test)

The secondary battery in a completely discharged state was subjected to a sweep test in which vibration at a frequency of 7 Hz, vibration at a frequency of 200 Hz, and vibration at a frequency of 7 Hz were applied to the secondary battery in order for 15 minutes in total. Note that vibration directions were set to three directions orthogonal to each other, including a Z-axis direction. The sweep test was conducted 12 times for each of the three directions. The number of evaluated cells was 100. Regarding a judgement criterion, a case where a rate of an increase in alternating-current resistance after the sweep test was lower than 10% was judged as "pass", and a case where the rate of the increase in the alternating-current resistance was higher than or equal to 10% was judged as "fail". Regarding the alternating-current resistance, a battery tester was used to supply a constant alternating-current at a measurement frequency of 1 kHz and measure an internal resistance of the battery from a voltage value of an alternating-current voltmeter.

(Projectile Test)

The projectile test defined in UL 1642 uses a secondary battery in a completely discharged state. However, in Examples, the projectile test was conducted on the secondary battery in a fully charged state, which was a stricter condition. In the projectile test defined in UL 1642, a center part of the secondary battery in a longitudinal direction is heated. However, in Examples, heating was performed on the battery can 11, at a position deviated from a center position in the Z direction, which served as the longitudinal direction, toward a bottom part by 15 mm. Except that the two test conditions described above were different, conditions of the projectile test in Examples were in accordance with the projectile test defined in UL 1642. Note that, here, the fully charged state refers to a state resulting from performing charging for 5 hours in an atmosphere at 23±2 ° C at a constant voltage of 4.20 V and at a constant current of 4.0 A (where the battery capacity is 4000 mAh). The number of evaluated cells was 100. Regarding a judgement criterion, a case where the entire secondary battery or a portion of the secondary battery did not fly through a test net was judged as "pass", and a case where the entire secondary battery or a portion of the secondary battery flew through the test net was judged as "fail".

TABLE 1

| | Number of pieces into which disk holder was divided | Pass rate in vibration test [%] | Pass rate in projectile test [%] |
|---|---|---|---|
| Example 1-1 | 6 | 100 | 95 |
| Example 1-2 | 3 | 95 | 100 |
| Example 1-3 | 7 | 97 | 85 |
| Example 1-4 | 2 | 85 | 95 |
| Comparative example 1-1 | 1 | 80 | 80 |

Comparative Example 1-1

Fabricated was the secondary battery disclosed in PTL 1 described above in which the disk holder was not divided, in other words, the number into which the disk holder was divided was 1. The fabricated secondary battery was subjected to the vibration test and the projectile test according to UL 1642 similar to those in Examples 1-1 to 1-4 described above. The results are also presented in Table 1.

As indicated in Table 1, the pass rate in the vibration test and the pass rate in the projectile test in each of Examples 1-1 to 1-4 both had values higher than those in Comparative example 1. In particular, in each of Examples 1-1 and 1-2, more favorable results were obtained in both the pass rate in the vibration test and the pass rate in the projectile test. It was thus confirmed that when the number of the insulating pieces 32P included in the disk holder 32 was greater than or equal to 3, the stripper disk 33 was held stably and firmly, as compared with when the number of the insulating pieces 32P was 2. It was also confirmed that when the number of the insulating pieces 32P included in the disk holder 32 was less than or equal to 6, a sufficient opening area was securable, and cleaving of the valve part 31V allowed for swift releasing of the gas generated inside the battery to the outside, as compared with when the number of the insulating pieces 32P was greater than or equal to 7.

Although the present technology has been described above with reference to some embodiments including Examples, the configuration of the present technology is not limited thereto, and is therefore modifiable in a variety of ways.

For example, the description has been given of the case where the battery device has a device structure of a wound type. However, the device structure of the battery device is not particularly limited, and may thus be another device structure such as a stacked type in which the electrodes (the positive electrode and the negative electrode) are stacked on each other, or a zigzag folded type in which the electrodes (the positive electrode and the negative electrode) are folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

Note that the effects described herein are mere examples. The effects of the present technology are therefore not limited to the effects described herein. Accordingly, any other effect may be obtained in relation to the present technology.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:

a battery device including a positive electrode, a negative electrode, and an electrolytic solution;

a container member containing the battery device; and a safety valve mechanism attached to an end part, of the container member, in a height direction, wherein the safety valve mechanism includes a valve member having an electrically conductive property, the valve member including a valve part and an annular protruding part, the valve part being cleavable, the annular protruding part extending along a horizontal plane and surrounding the valve part, the horizontal plane being orthogonal to the height direction, an insulating holder member including insulating pieces into which the insulating holder member is divided in a circling direction in which the annular protruding part extends, the insulating pieces each including an abutting part positioned on an inner side of the annular protruding part in a radial direction of the container member and abutting against the annular protruding part, and an electrically conductive member including a projecting part electrically coupled to the valve part, the electrically conductive member overlapping with the valve member in the height direction and being held by the insulating holder member.

2. The secondary battery according to claim 1, wherein the insulating pieces each further include a first flange part positioned on an outer side in the radial direction when viewed from the abutting part and extending along the horizontal plane, the abutting part includes an abutting surface abutting against the annular protruding part, and the abutting surface is inclined, with respect to the height direction, to become more toward the outer side in the radial direction with increasing distance from the first flange part.

3. The secondary battery according to claim 1, wherein the electrically conductive member includes a second flange part extending along the horizontal plane, and the abutting part of each of the insulating pieces has a lateral groove in which the second flange part is disposed, the lateral groove extending toward an outer side in the radial direction from an open end facing an inner side in the radial direction.

4. The secondary battery according to claim 1, wherein the container member has a substantially cylindrical shape, and the insulating pieces include respective border surfaces each extending in the radial direction of the container member, and are disposed to allow the respective border surfaces to be opposed to each other.

5. The secondary battery according to claim 4, wherein the insulating pieces are disposed along the horizontal plane and surround the projecting part.

6. The secondary battery according to claim 1, wherein number of the insulating pieces is greater than or equal to 3 and less than or equal to 6.

7. The secondary battery according to claim 1, wherein the insulating pieces are substantially the same as each other in size and shape.

8. The secondary battery according to claim 1, wherein the insulating pieces have respective first openings provided through the insulating pieces in the thickness direction, and the electrically conductive member has second openings provided through the electrically conductive member in the thickness direction, the second openings being provided at respective positions corresponding, in the thickness direction, to positions of the first openings provided in the respective insulating pieces.

9. The secondary battery according to claim 1, wherein the container member includes a container part and a cover part, the container part including an open end part through which the battery device is passable, the open end part being provided at an end part of the container part in the height direction, the cover part closing the open end part, and the safety valve mechanism is provided on an inner side of the cover part in the height direction.

10. The secondary battery according to claim 9, wherein the valve member is positioned between the cover part and the electrically conductive member.

11. The secondary battery according to claim 1, wherein the secondary battery comprises a lithium-ion secondary battery.

* * * * *